Patented July 27, 1937

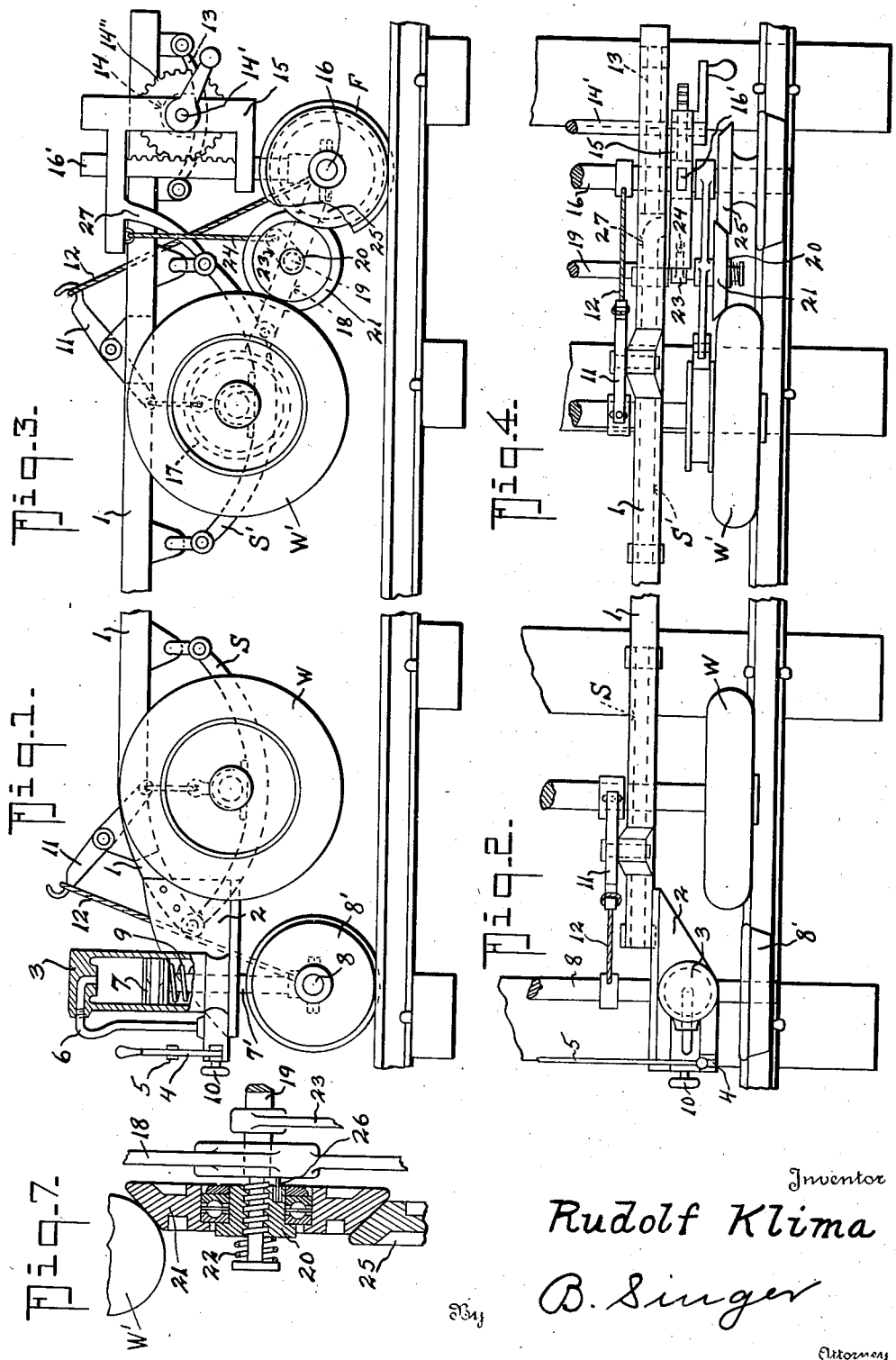

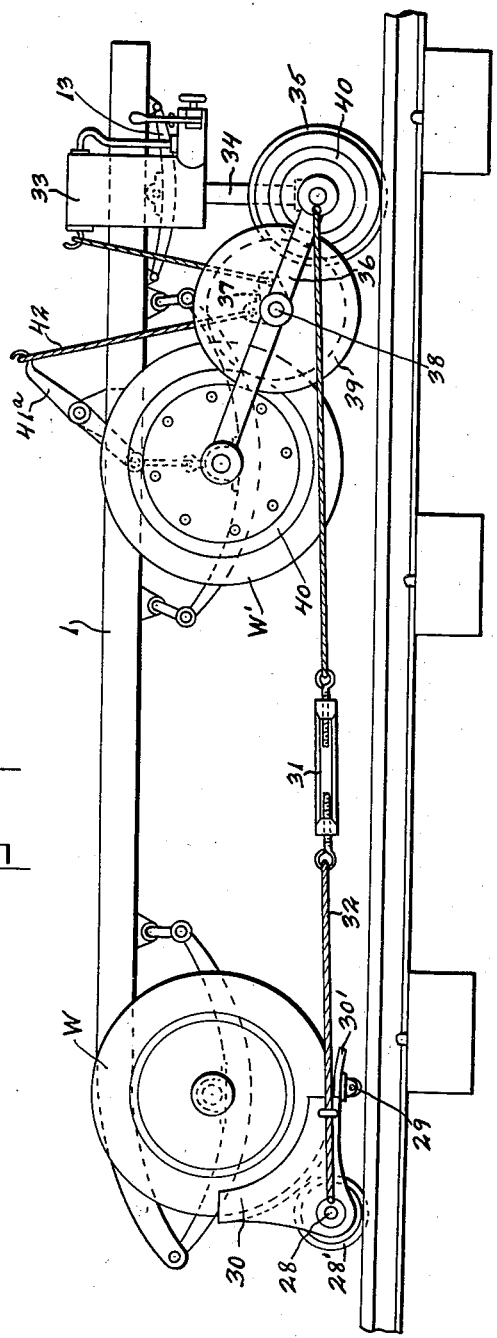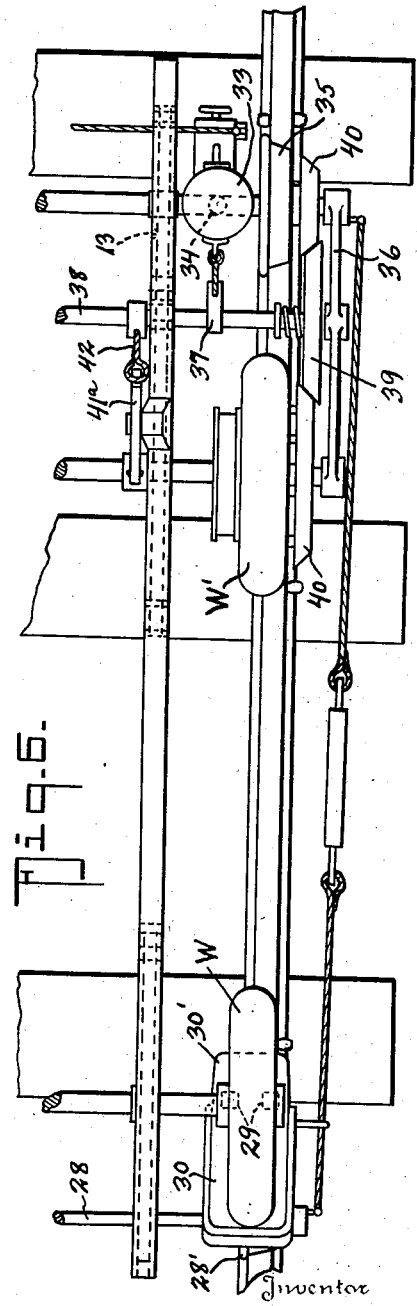

2,088,522

UNITED STATES PATENT OFFICE 2,088,522

ARRANGEMENT FOR CONVERTING A STREET VEHICLE INTO A RAILROAD VEHICLE AND VICE VERSA

Rudolf Klima, Salzburg, Austria

Application October 26, 1935, Serial No. 46,961
In Austria June 25, 1934

11 Claims. (Cl. 105—215)

The present invention has for an object means readily to convert a road vehicle into a railway vehicle in a simple manner and without altering the construction of the road vehicle.

Further, the invention has for an object to provide means whereby the road vehicle may utilize its own power to propel it when converted into a railway vehicle.

Further, it is an object of the invention to provide transportable equipment for adapting a road vehicle to run on rails, the equipment being such that it may be attached without any shop assistance and without the necessity of special tools for the purpose.

Further, it is an object of the present invention to provide additional equipment for a road vehicle which comprises trucks of a single axle, which trucks may be coupled with each other when desired.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:—

Fig. 1 is a side elevation of the chassis frame and front wheel construction of a road vehicle embodying one form of the invention.

Fig. 2 is a top plan view of one side of the vehicle showing the parts shown in Fig. 1.

Fig. 3 is a view similar to Fig. 1 of the rear portion of the vehicle frame and rear wheel mounting means and embodying resiliently attached jacks and means to operate the same for lifting the rear wheels of the road vehicles and lowering railroad wheels for travel of the vehicle on rails;

Figs. 1 and 3 may be read as one to illustrate a single vehicle, the frame 1 being broken apart for convenience of illustration.

Fig. 4 is a top plan view similar to Fig. 2 of the parts shown in Fig. 3; Figs. 2 and 4, like Figs. 1 and 3 may be read as one.

Fig. 5 is a side elevation of the frame and wheel structure of a road vehicle, embodying another form of the invention.

Fig. 6 is a top plan view of one side of the vehicle shown in Fig. 5.

Fig. 7 is a detail view, partly in section and partly in elevation, hereinafter referred to.

The construction shown in Figs. 1 and 2: In this embodiment of the invention 1 represents the chassis frame of a motor vehicle, W represents the front wheels and axles or spindles, and S the usual spring suspension for the wheels. To the front of the frame 1 at each side of the vehicle brackets 2 are secured. These brackets 2 project forwardly and carry hydraulic cylinders 3 in which pistons 7 are carried, the pistons having rods 7' which at their lower ends carry a cross axle 8 having flanged wheels 8' (railroad wheels).

Air pumps of any approved construction are mounted on the brackets 2 and have their operating levers 4 connected together by a cross rod 5 to operate in unison when either lever 4 is used. These pumps deliver air under pressure via ducts 6 to the cylinders 3 above the pistons 7. Springs 9 below the pistons 7 serve as cushions and as piston-return springs. Relief valves 10 of any approved construction serve to enable the operator to release the air in the cylinders 3 when it is desired again to convert the rail vehicle into a road vehicle.

A rocking lever 11 is mounted at each side of the frame 1, and has one end connected with the axle for the wheel W, and has its other end connected by a suitable connection 12 with the axle 8. From the above it will be seen that when the parts are as shown in Fig. 1, compressed air in the cylinders 3 will have forced the pistons 7 down to bring wheels 8' onto the rails and at the same time, by pulling on connection 12, the wheels W are raised clear of the rails R. The valves 10 being shut, the parts will remain in the position shown in Fig. 1. To retract the wheels 8' and simultaneously lower wheels W again it is only necessary to open valves 10.

The construction shown in Figs. 3 and 4: In this embodiment of the invention at each side of the frame 1 is secured a supporting spring 13 carrying a bearing 14. In the opposite bearings 14 a crank shaft 14' is journaled and on this shaft at each end a gear 14'' is carried to mesh with a rack bar 16' carrying a bearing for the railway axle 16 on which the flanged railway wheels F are carried. A frame 15, on the crank shaft 14', has provisions for carrying the rack bar 16'. 18 are rods or bars which are suitably mounted at one end, for instance, on the brake drums 17 of the vehicle, and whose other ends carry the axle 16.

A cross rod 19, provided with oppositely pitched screw threads, is mounted rotatably in the rods 18. Bearing bushes 20 (Fig. 7), provided with suitable screw threads, are mounted on the screw threaded parts of the cross rod 19 and are positively movable in a direction sidewise of the vehicle. A friction disc 21 is mounted on each bush 20 by means of ball bearings. Coil springs 22 continuously tend to move the bushes inwardly. The bushes 20 are held from turning by bolts 26 fixed to the bars 18 and projecting into recesses in the bushings.

Arms 23 secured one near each end of the cross rod 19 are connected by cables 24 (Fig. 3) with the frame 15.

The parts 14', 15, 16' constitute a winch.

27 is an arm carried by the pivoted frame (pivoted on 14') which is adapted to engage the end of the spring S' that carries the axle for wheel W', the arm 27 serving as a brace when the parts are positioned as shown in Figs. 3 and 4.

So far as described, the operation of the parts shown in Figs. 3, 4 and 7 is as follows: When positioned as in Figs. 3, 4 and 7, the wheels W' will be elevated and the wheels F lowered to engage rail R; the friction discs 21 will be held in driving contact with wheels W' (the driving wheels of the road vehicle) and with friction wheel flanges 25 on wheels F, thereby driving the vehicle along the rails through wheels F. Now, if it be desired to restore the vehicle to run on a road, the winch is operated to raise rack bar 16' which swings bars 18 on their pivots and raises axle 16 with the wheels F, while at the same time lowering wheels W'; this also slacks cables 24 and allows springs 22 to release discs 21 from W' and 25.

When the mechanism shown in Figs. 1 and 2 is used on the front of the vehicle, that shown in Figs. 3 and 4 is used on the rear of the vehicle; therefore, Figs. 1 and 3 and 2 and 4, in reality, represent but one vehicle.

In the embodiment shown in Figs. 5 and 6: In this embodiment, the means to raise the front wheels W of the road vehicle and supply railway wheels to carry the load on rails is not an attached part to the frame 1, but is intended to be detached and carried on the vehicle as baggage when the vehicle is used to run on roads.

In this embodiment of the invention, when the vehicle is being used as a railroad vehicle, the front wheels W rest separately on wheel shoes 30, which are mounted on a railway axle 28 that carries the usual flanged wheels 28'. The shoes 30 are shaped to fit the wheels and at their rear ends they have curved lips 30' and are provided with rollers 29. When wheels 28' are resting on the rails, shoes 30 may have a pivotal movement on the axle 28. Cables 32 with turnbuckles 31 connect the front axle 28 with the rear railway axle 35, or with some other relatively fixed points of the vehicle. When shoes 30 are drawn up to wheels W, by the cables 32 and turnbuckles 31, the shoes will be forced under the wheels which will ride into the shoes and be thereby held elevated, the weight of the vehicle at the front being then carried by wheels 28' and axle 28. By loosening the turnbuckles 31 and disconnecting the cables 32 the shoes 30 may be removed with axle 28 and wheels 28' and placed on board the vehicle as a part of its load.

The mechanism used at the rear of the vehicle in Figs. 5 and 6 is similar to that used in Figs. 3 and 4 and consists of hydraulic jacks 33 similar to the jacks (hydraulic) 3, etc., hereinbefore described with relation to Figs. 1 and 2, differing therefrom only in that they are mounted on the springs 13 (resiliently) instead of on fixed brackets as in Fig. 1. The railway axle 35, carrying the flanged wheels, is carried by the piston rods 34 and is pivotally connected with the rear wheels W' by arms or rods 36. These arms 36 also carry the cross rod 38 (corresponding to 19 in Figs. 3 and 7) which is provided with the operating lever 37 and on which are mounted the shiftable friction discs 39, which are adapted to be brought into and out of engagement with friction discs 40 on wheels W', and on wheels 35 by mechanism similar to that shown in Fig. 7. A lever 41a, pivotally mounted on frame 1, has one end connected with the rear wheel axle and its other end connected by cable 42 to rod 38 and serves the same general purpose as the like parts in Fig. 3 and similar parts in Fig. 1.

The operation of the parts shown at the rear end of Fig. 5 is essentially the same as corresponding parts, save that a hydraulic jack is used in lieu of a winch. Further specific discussion of the operation of Fig. 5 is therefore thought to be unnecessary.

From the foregoing description, taken in connection with the accompanying drawings, it is thought that the invention will be clear to those skilled in the art.

What I claim is:

1. In means for converting a motor vehicle of the road type into a railway vehicle; a railway axle with flanged wheels to run on a railway track, wheel-shoes rockably mounted on said axle and being of general wedge shape in side elevation so that when the shoes are in one position they will lie with one edge in contact with the right of way whereby the adjacent wheels of the motor vehicle can be brought into cooperative relation with the shoes, and means cooperative with said shoes to raise the adjacent wheels of the motor vehicle off the ground.

2. In means for converting a motor vehicle of the road type into a railway vehicle; a railway axle with flanged wheels to run on a railway track, wheel-shoes rockably mounted on said axle and being of general wedge shape in side elevation so that when the shoes are in one position they will lie with one edge in contact with the right of way whereby the adjacent wheels of the motor vehicle can be brought into cooperative relation with the shoes, said shoes cooperating with the front wheels of the motor vehicle proper; a second railway axle with flanged wheels to travel on rails and being carried by the motor vehicle at the rear, jack mechanisms for lowering and raising said second axle with its wheels into and out of operative contact with the rails and means for simultaneously raising and lowering the motor vehicle's rear wheels from the ground; and means cooperatively connecting the front and back railway axles together under tension whereby the entire weight of the vehicle is carried by said railway axles and their flanged wheels.

3. In means for converting a motor vehicle of the road type into a railway vehicle; a railway axle with flanged wheels to run on a railway track, wheel-shoes rockably mounted on said axle and being of general wedge shape in side elevation so that when the shoes are in one position they will lie with one edge in contact with the right of way whereby the adjacent wheels of the motor vehicle can be brought into cooperative relation with the shoes, said shoes cooperating with the front wheels of the motor vehicle proper; a second railway axle with flanged wheels to travel on rails and being carried by the motor vehicle at the rear, jack mechanisms for lowering and raising said second axle with its wheels into and out of operative contact with the rails and means for simultaneously raising and lowering the motor vehicle's rear wheels from the ground; and means cooperatively connecting the front and back railway axles together under tension whereby the entire weight of the vehicle is carried by said railway axles and their flanged wheels, said means cooperatively connecting the front and back axles comprising elongated members with turn-buckles connected to the front shoes and with the rear railway axle.

4. In means for converting a motor vehicle of the road type into a railway vehicle; a railway axle with flanged wheels to run on a railway track, wheel-shoes rockably mounted on said axle and being of general wedge shape in side elevation so that when the shoes are in one position they will lie with one edge in contact with the right of way whereby the adjacent wheels of the motor vehicle can be brought into cooperative relation with the shoes, means cooperative with said shoes to raise the adjacent wheels of the motor vehicle off the ground, said means comprising arms pivoted to the motor vehicle adjacent the rear axle thereof, a second railway axle with flanged wheels carried by said arms, jacks for raising and lowering said second axle, connections between said arms and the rear axle of the motor vehicle in virtue of which as the second axle is lowered to bring its flanged wheels to the rails the rear wheels of the motor vehicle will be lifted from the road, and tensioned connections between said second axle and said wheel-shoes for holding the wheel-shoes in position to elevate the front wheels of the motor vehicle.

5. In a motor vehicle having the usual front wheels, and rear wheels and axle, and springs between the rear axle and the frame of the vehicle; the combination with a railway axle having flanged wheels, arms pivoted to the motor vehicle and rotatably carrying said railway axle, jacks mounted on the motor vehicle and connected to said railway axle and including means normally holding said railway axle elevated and means for lowering the same at times, levers pivotally mounted on the motor vehicle, connecting elements between said levers and the rear axle of the motor vehicle and between said levers and the railway axle whereby when said railway axle is lowered to engage the flanged wheels with a track, the rear wheels of the motor vehicle will be lifted clear of the track and roadway and vice-versa, and adapters including a railway axle and flanged wheels for receiving the front wheels of the motor vehicle to raise them from the ground when the motor vehicle is operating as a railway vehicle.

6. In a motor vehicle having the usual front wheels, and rear wheels and axle, and springs between the rear axle and the frame of the vehicle; the combination with a railway axle having flanged wheels, arms pivoted to the motor vehicle and rotatably carrying said railway axle, jacks mounted on the motor vehicle and connected to said railway axle and including means normally holding said railway axle elevated and means for lowering the same at times, levers pivotally mounted on the motor vehicle, connecting elements between said levers and the rear axle of the motor vehicle and between said levers and the railway axle whereby when said railway axle is lowered to engage the flanged wheels with a track, the rear wheels of the motor vehicle will be lifted clear of the track and roadway and vice-versa; power transmitting means including shiftable clutch elements for transmitting power from the motor vehicle through the rear wheels thereof to said railway axle; and adapters including a railway axle and flanged wheels for receiving the front wheels of the motor vehicle to raise them from the ground when the motor vehicle is operating as a railway vehicle.

7. In a motor vehicle having the usual front wheels, and rear wheels and axle, and springs between the rear axle and the frame of the vehicle; the combination with a railway axle having flanged wheels, arms pivoted to the motor vehicle and rotatably carrying said railway axle, jacks mounted on the motor vehicle and connected to said railway axle and including means normally holding said railway axle elevated and means for lowering the same at times, levers pivotally mounted on the motor vehicle, connecting elements between said levers and the rear axle of the motor vehicle and between said levers and the railway axle whereby when said railway axle is lowered to engage the flanged wheels with a track, the rear wheels of the motor vehicle will be lifted clear of the track and roadway and vice-versa, adapters including a railway axle and flanged wheels for receiving the front wheels of the motor vehicle to raise them from the ground when the motor vehicle is operating as a railway vehicle, and means carried by said jacks for engaging the vehicle springs as abutments to brace the same when the vehicle is operating as a railway vehicle.

8. In a motor vehicle having the usual front wheels, and rear wheels and axle, and springs between the rear axle and the frame of the vehicle; the combination with a railway axle having flanged wheels, arms pivoted to the motor vehicle and rotatably carrying said railway axle, jacks mounted on the motor vehicle and connected to said railway axle and including means normally holding said railway axle elevated and means for lowering the same at times, levers pivotally mounted on the motor vehicle, connecting elements between said levers and the rear axle of the motor vehicle and between said levers and the railway axle whereby when said railway axle is lowered to engage the flanged wheels with a track, the rear wheels of the motor vehicle will be lifted clear of the track and roadway and vice-versa, power transmitting means including shiftable clutch elements for transmitting power from the motor vehicle through the rear wheels thereof to said railway axle, adapters including a railway axle and flanged wheels for receiving the front wheels of the motor vehicle to raise them from the ground when the motor vehicle is operating as a railway vehicle, and means carried by said jacks for engaging the vehicle springs as abutments to brace the same when the vehicle is operating as a railway vehicle.

9. In means to adapt a road motor vehicle to travel on rails, a front railway axle having flanged wheels and a rear railway axle having flanged wheels, means for locating a motor vehicle between the front and rear railway axles, said means including wheel-shoes rockably mounted on the front railway axle for receiving the front wheels of the motor vehicle and means connecting the front and rear railway axles together under tension applied through the weight of the vehicle and for rocking said shoes to raise the wheels of the vehicle carried thereby clear of the ground, and means for transmitting the driving power of the rear wheels of the motor vehicle to the rear railway axle, and including a shiftable clutch element.

10. In mechanism for the purposes described, a road vehicle having a chassis frame, and spring suspended road wheels and axles, jacks carried by said frame, axles with flanged wheels to run on rails carried by said jacks, means normally holding said last named axles and wheels elevated, means to operate said jacks to lower said flanged wheels to engage track rails and simultaneously raise said road wheels off the ground, and rocking levers carried by said chassis, each lever being connected at one end with the adjacent axle of the road wheels and connected at the other end with the axle having the flanged wheels.

11. In mechanism for the purposes described, a road vehicle having a chassis frame, and spring suspended road wheels and axles, jacks carried by said frame, axles with flanged wheels to run on rails carried by said jacks, means normally holding said last named axles and wheels elevated, means to operate said jacks to lower said flanged wheels to engage track rails and simultaneously raise said road wheels off the ground, rocking levers carried by said chassis, each lever being connected at one end with the adjacent axle of the road wheels and connected at the other end with the axle having the flanged wheels, a friction drive connection between the powered wheels of the road vehicle and the adjacent flanged wheels, and means automatically to render said connection operative or inoperative accordingly as the flanged wheels or the road wheels are down in running position.

RUDOLF KLIMA.